Patented Apr. 17, 1923.

1,452,309

UNITED STATES PATENT OFFICE.

GUSTAV MONRATH, OF NEW YORK, N. Y., ASSIGNOR, BY MESNE ASSIGNMENTS, TO THE BARBER ASPHALT PAVING COMPANY, OF PHILADELPHIA, PENNSYLVANIA, A CORPORATION OF WEST VIRGINIA.

ASPHALT STRUCTURE AND COMPOSITION.

No Drawing. Application filed February 1, 1918. Serial No. 214,903.

*To all whom it may concern:*

Be it known that I, GUSTAV MONRATH, a citizen of the United States, residing at No. 270 Convent Avenue, New York city, in the county of New York, State of New York, have invented certain new and useful Improvements in Asphalt Structures and Compositions; and I do hereby declare the following to be a full, clear, and exact description of the invention, such as will enable others skilled in the art to which it appertains to make and use the same.

This invention relates to asphalt structures and compositions capable of withstanding successfully comparatively high temperatures without objectionable softening, and having a desirable hardness combined with toughness but without objectionable brittleness.

The structures of the present invention are made of a novel asphalt composition which is itself resistant to comparatively high temperatures without softening and which, when embodied in the structures, imparts thereto similar desirable properties.

The essential components of which the novel composition is made up are petrolene, asphaltene and carbenes. Asphalts generally contain these components in varying proportions; and, in making up the composition of the present invention, different asphalts may be combined or blended, in accordance with their percentage composition of these particular components, to give a composition containing these components in the proper proportions.

The components themselves may be generally described as follows:

Petrolene is the constituent or mixture of constituents of asphalts characterized by solubility in 85% naphtha;

Asphaltene is the constituent or mixture of constituents characterized by solubility in carbon tetrachloride;

Carbenes are the constituents characterized by solubility in carbon bi-sulfide.

The respective proportions of these components in different kinds of asphalt may be determined by extraction thereof with the respective solvents above referred to.

The composition of the present invention consists generally of the above-mentioned components in substantially the following proportions:

Petrolene about 20 to 30%.
Asphaltene about 50 to 70%.
Carbenes about 10 to 20%.

The novel composition of the present invention may be made by combining or blending different kinds or grades of asphalt, in accordance with their components of these particular constituents, in order to give a composition such as that above described. The proportions of these components is such that there is retained in the composition a desirable toughness without objectionable brittleness. The composition is nevertheless hard and will stand temperatures around 100° C. without objectionable softening, for example, without softening enough to slide when used as an acid-proof lining for tanks, or when used for pipes for conveying acids at temperatures around 40 to 80° C. under pressures of 60 to 30 pounds per square inch. The compositions will, at the same time, successfully withstand temperatures considerably below freezing without objectionable brittleness or cracking.

In the production of the novel structures of the present invention, the asphalt composition may be applied without admixture of other constituents; but it is preferably applied in the form of a mastic mixture by adding from 20 to 30% of a fine silicious dust, of a light bulky character, which will be retained in suspension in the molten asphalt composition as a filler. It is, of course, obvious that any inert inorganic filler having similar physical properties may be used. The molten composition, containing the filler, may then be combined with from 50 to 75% of a silica sand and gravel, so proportioned that the asphalt composition will substantially fill out the voids between the particles of the aggregate. The asphalt composition acts as a cement or binder and it will usually be desirable to use as small amount of the material as possible to fill such voids and give the greatest possible tensile strength.

The asphalt composition, or the mastic composition made therefrom, may be used for various purposes where a hard and tough structure is desired, free from objectionable brittleness, and capable of withstanding relatively high temperatures without objectionable softening and low temperatures without cracking.

The composition is thus of importance for the production of pipes, inasmuch as pipes or conduits can be made which will withstand temperatures of boiling water or of steam without undue softening, and which will at the same time be acid-resistant and hence available for the conveyance of hot acid liquor. It has thus been found that pipes made of the novel composition will safely convey hot acid liquors at a temperature from 40 to 80° C. and under a pressure of from 60 to 30 pounds per square inch. For the conveyance of cold liquor, the pipes can be made to withstand much greater pressures, for example, up to 200 pounds per square inch or even higher.

In constructing pipes of the new composition, the asphalt mastic may be heated until it is sufficiently fluid to pour into a mould; and the pipe can then be cast in an appropriate mold, for example, in the manner described in my prior U. S. applications Serial Nos. 100,413, filed May 27, 1916, or Sr al No. 129,959, filed November 7, 1916. It will be evident that the pipes may be made of various sizes and thickness and hence resistant to varying degrees of pressure. So also, it will be understood that various types and kinds of re-enforcement may be embodied in the pipes or conduits, for example, re-enforcement such as is used in concrete structures, or re-enforcement made of expanded metal lath, or perforated metal, etc.

The mastic composition can also be used for the lining of pipes or pipe fittings by casting the molten composition therein, for example, in the manner described in my prior U. S. application Serial No. 129,958 filed November 7, 1916, and Serial No. 204,713 filed November 30, 1917. By casting the composition within metal pipes or pipe fittings, such pipes and pipe fittings can be made acid-resistant throughout, and capable of withstanding not only very high pressures, but also relatively high temperatures without objectionable softening of the asphalt or asphalt mastic lining.

The novel mastic composition is also of importance for lining tanks where it is desirable to store hot acid liquors or other hot liquors requiring a resistant container. The composition may thus be applied, in a fluid or semifluid condition, to a metal lath or other support or reenforcement and the entire tank or other receptacle thereby lined with the acid-resistant material. Apparatus such as reservoirs and the like described in my prior U. S. Patent No. 1,219,840, granted March 20, 1917, may, with advantage, be lined with the improved mastic composition.

It will be evident also that pumps and other apparatus for conveying or storing hot acid liquors may be similarly lined with the improved mastic composition, or may have parts of their structures made of such composition.

In general, it may be stated that the novel composition is available generally for the production of various structures by heating the composition to a temperature enabling it to be cast or otherwise worked or applied to produce the desired lining or structure, and by then permitting the composition to cool and set in its desired form or shape.

Where conduits are desired, which are not entirely enclosed, such as flumes, a lining of the composition may be applied to the bottom of the flume and the desirable resistance to hot acid liquors and to high temperatures imparted thereto.

Having thus described my invention, what I claim is:

1. Asphalt mastic structures made in part of an asphalt composition comprising the following ingredients in substantially the following proportions: petrolene about 20 to 30%; asphaltene about 50 to 70%; carbenes about 10 to 20%.

2. Asphalt mastic structures made of an asphalt mastic composition containing the following ingredients in substantially the following proportions: petrolene about 20 to 30%; asphaltene about 50 to 70%; carbenes about 10 to 20%, together with an inorganic filling material.

3. Alphalt mastic structures made of an asphalt mastic composition containing the following ingredients in substantially the following proportions: petrolene about 20 to 30%; asphaltene about 50 to 70%; carbenes about 10 to 20%, together with about 20 to 30% of a fine silicious filler.

4. Asphalt mastic structures made of an asphalt mastic composition containing the following ingredients in substantially the following proportions: petrolene about 20 to 30%; asphaltene about 50 to 70%; carbenes about 10 to 20%, together with a fine silicious filler and sand and gravel.

5. Asphalt mastic structures made of an asphalt mastic composition containing the following ingredients in substantially the following proportions: petrolene about 20 to 30%; asphaltene about 50 to 70%; carbenes about 10 to 20%, together with a fine silicious filler and 50 to 70% of silica sand and gravel.

In testimony whereof I affix my signature.

GUSTAV MONRATH.